(12) United States Patent
Yamaguchi et al.

(10) Patent No.: US 12,330,901 B2
(45) Date of Patent: Jun. 17, 2025

(54) PAPER FEEDING ROLL AND METHOD FOR MANUFACTURING SAME

(71) Applicant: Sumitomo Riko Company Limited, Aichi (JP)

(72) Inventors: Kazushi Yamaguchi, Aichi (JP); Hirotoshi Matsuda, Aichi (JP); Satoshi Endo, Aichi (JP); Manabu Sakuda, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 58 days.

(21) Appl. No.: 18/446,485

(22) Filed: Aug. 9, 2023

(65) Prior Publication Data
US 2023/0382672 A1    Nov. 30, 2023

Related U.S. Application Data

(63) Continuation of application No. PCT/JP2022/020754, filed on May 19, 2022.

(30) Foreign Application Priority Data

May 26, 2021    (JP) ................. 2021-088433

(51) Int. Cl.
*B65H 5/06*    (2006.01)
*B65H 3/06*    (2006.01)
*B65H 27/00*    (2006.01)

(52) U.S. Cl.
CPC .............. *B65H 5/06* (2013.01); *B65H 3/0638* (2013.01); *B65H 2404/19* (2013.01)

(58) Field of Classification Search
CPC .......... B65H 27/00; B65H 5/062; B65H 5/06; B65H 3/0638; B65H 3/06; B65H 2404/19;
(Continued)

(56) References Cited

U.S. PATENT DOCUMENTS

2004/0026844 A1*    2/2004    Toriumi ................. B65H 27/00
                                                                              271/109

FOREIGN PATENT DOCUMENTS

JP    2008290826        12/2008
JP    2009220990 A  * 10/2009
JP    2018020884 A  *  2/2018

OTHER PUBLICATIONS

"International Search Report (Form PCT/ISA/210) of PCT/JP2022/020754", mailed on Jun. 28, 2022, with English translation thereof, pp. 1-4.

* cited by examiner

*Primary Examiner* — Luis A Gonzalez
(74) *Attorney, Agent, or Firm* — JCIPRNET (57) ABSTRACT

A paper feeding roll includes a shaft body and an elastic material layer. A first outer diameter portion and a second outer diameter portion having a larger outer diameter than the first outer diameter portion are provided in a portion where the elastic material layer is provided. A sloping portion is provided connecting between the first and second outer diameter portions so that the outer diameter varies along an axial direction. The sloping portion occupies 3% to 80% of the portion where the elastic material layer is provided. A difference in outer diameter between the first and second outer diameter portions is 50 μm to 1,000 μm. Protrusions that form surface unevenness are formed on an outer peripheral surface of the elastic material layer. Surface roughness of the first outer diameter portion is 50% to 200% of a step difference between the first and second outer diameter portions.

7 Claims, 3 Drawing Sheets

(58) Field of Classification Search
CPC ...... B65H 2404/114; B65H 2404/1141; B65H 2404/1151; B65H 2404/1312; B65H 2404/13171; B65H 2404/131; B65H 2404/18; B65H 2404/181; B65H 2404/185; B65H 2404/187
See application file for complete search history.

PAPER FEEDING ROLL AND METHOD FOR MANUFACTURING SAME

CROSS-REFERENCE TO RELATED APPLICATION

This application is a continuation of PCT International Application No. PCT/JP2022/020754, filed on May 19, 2022, which claims priority under 35 U.S.C. § 119(a) to Japanese Patent Application No. 2021-088433, filed on May 26, 2021. Each of the above application(s) is hereby expressly incorporated by reference, in its entirety, into the present application.

BACKGROUND

Technical Field

The disclosure relates to a paper feeding roll suitable for use in an electrophotographic apparatus such as a copier, a printer or a fax machine employing an electrophotographic system.

Related Art

A paper feeding roll is formed in a cylindrical shape from an elastic material such as a rubber crosslinked body, and a peripheral surface thereof serves as a contact surface with sheet paper. Paper dust generated from the sheet paper may adhere to the peripheral surface of the paper feeding roll. During repetitive contact with the sheet paper, the peripheral surface of the paper feeding roll may have the paper dust accumulated thereon. When the paper dust is accumulated, the contact area of the peripheral surface with respect to the sheet paper decreases, and a coefficient of friction of the contact surface with respect to the sheet paper decreases. As a result, sheet paper conveyance failure may occur.

In order to reduce the occurrence of sheet paper conveyance failure, there is known a paper feeding roll in which unevenness is formed on a peripheral surface of the paper feeding roll. For example, Japanese Patent Laid-Open No. 2008-290826 describes a paper feeding roll in which a plurality of recessed grooves extending in a circumferential direction are formed at predetermined intervals in an axial direction on a peripheral surface of the paper feeding roll, and a fine uneven portion of an embossed shape is formed on both an outer peripheral surface of a convex band formed of a portion without the recessed grooves and a groove bottom of the recessed grooves.

The conventional paper feeding rolls are not sufficient in terms of reducing accumulation of paper dust and maintaining a good coefficient of friction over a long period of time from an initial stage of use. If unevenness is formed on the peripheral surface of the roll, accumulation of paper dust may be reduced by discharging the paper dust to a recess of the unevenness, and a good coefficient of friction may be maintained. However, when the unevenness on the peripheral surface of the roll wears away due to long-term use, the paper dust may stop being discharged and may adhere to the peripheral surface of the roll, and the coefficient of friction of the peripheral surface of the roll may decrease, resulting in sheet paper conveyance failure. In particular, there is low-quality sheet paper among the sheet papers used in recent years. In the low-quality sheet paper, a large amount of paper dust is likely to be generated, and sheet paper conveyance failure is likely to occur in a relatively early stage.

SUMMARY

A paper feeding roll according to one aspect includes a shaft body and an elastic material layer formed on an outer peripheral surface of the shaft body. A first outer diameter portion having a relatively small outer diameter and a second outer diameter portion having a larger outer diameter than the first outer diameter portion are provided in a portion where the elastic material layer is provided. Between the first outer diameter portion and the second outer diameter portion, a sloping portion is provided connecting between the first outer diameter portion and the second outer diameter portion so that the outer diameter varies in a direction along an axial direction. A proportion of the sloping portion in the portion where the elastic material layer is provided is 3% or more to 80% or less. A difference in outer diameter between the first outer diameter portion and the second outer diameter portion is 50 μm or more to 1,000 μm or less. A plurality of protrusions that form surface unevenness are formed on an outer peripheral surface of the elastic material layer. Surface roughness Rz of the first outer diameter portion is 50% or more to 200% or less of a step difference between the first outer diameter portion and the second outer diameter portion.

An extension direction of the protrusion formed in the elastic material layer in the sloping portion may be different from the extension direction of the protrusion formed in the elastic material layer in the first outer diameter portion and the extension direction of the protrusion formed in the elastic material layer in the second outer diameter portion. The proportion of the sloping portion in the portion where the elastic material layer is provided may be 10% or more to 50% or less. The second outer diameter portion may be located in an area including an axial center. The surface roughness Rz of the first outer diameter portion, the second outer diameter portion and the sloping portion may be 25 μm or more to 500 μm or less. The shaft body may include a portion having a relatively large outer diameter in the second outer diameter portion. The first outer diameter portion, the second outer diameter portion and the sloping portion may be formed due to an outer shape of the shaft body.

A method for manufacturing a paper feeding roll according to another aspect is a method for manufacturing the paper feeding roll described above, in which the shaft body is inserted into the elastic material layer formed in a cylindrical shape, and the paper feeding roll is formed.

DESCRIPTION OF THE EMBODIMENTS

The disclosure provides a paper feeding roll in which sheet paper conveyance failure is reduced over a long period of time.

According to the paper feeding roll according to the disclosure, the paper feeding roll includes a shaft body and an elastic material layer formed on an outer peripheral surface of the shaft body. A first outer diameter portion having a relatively small outer diameter and a second outer diameter portion having a larger outer diameter than the first outer diameter portion are provided in a portion where the elastic material layer is provided. Between the first outer diameter portion and the second outer diameter portion, a sloping portion is provided connecting between the first outer diameter portion and the second outer diameter portion so that the outer diameter varies in a direction along an axial direction. A proportion of the sloping portion in the portion where the elastic material layer is provided is 3% or more to 80% or less. A difference in outer diameter between the first outer diameter portion and the second outer diameter portion is 50 µm or more to 1,000 µm or less. A plurality of protrusions that form surface unevenness are formed on an outer peripheral surface of the elastic material layer. Surface roughness Rz of the first outer diameter portion is 50% or more to 200% or less of a step difference between the first outer diameter portion and the second outer diameter portion. In the paper feeding roll according to the disclosure, since there is a step difference between the first outer diameter portion and the second outer diameter portion, even if the number of sheets fed increases and the surface unevenness of the second outer diameter portion wears away, a coefficient of friction is maintained by the surface unevenness of the first outer diameter portion. At this time, a main part in contact with sheet paper switches from the second outer diameter portion to the first outer diameter portion. Even during the switching from the second outer diameter portion to the first outer diameter portion, a decrease in the coefficient of friction is suppressed by the sloping portion connecting between the first outer diameter portion and the second outer diameter portion. According to the above, sheet paper conveyance failure can be reduced over a long period of time.

Figure 1:
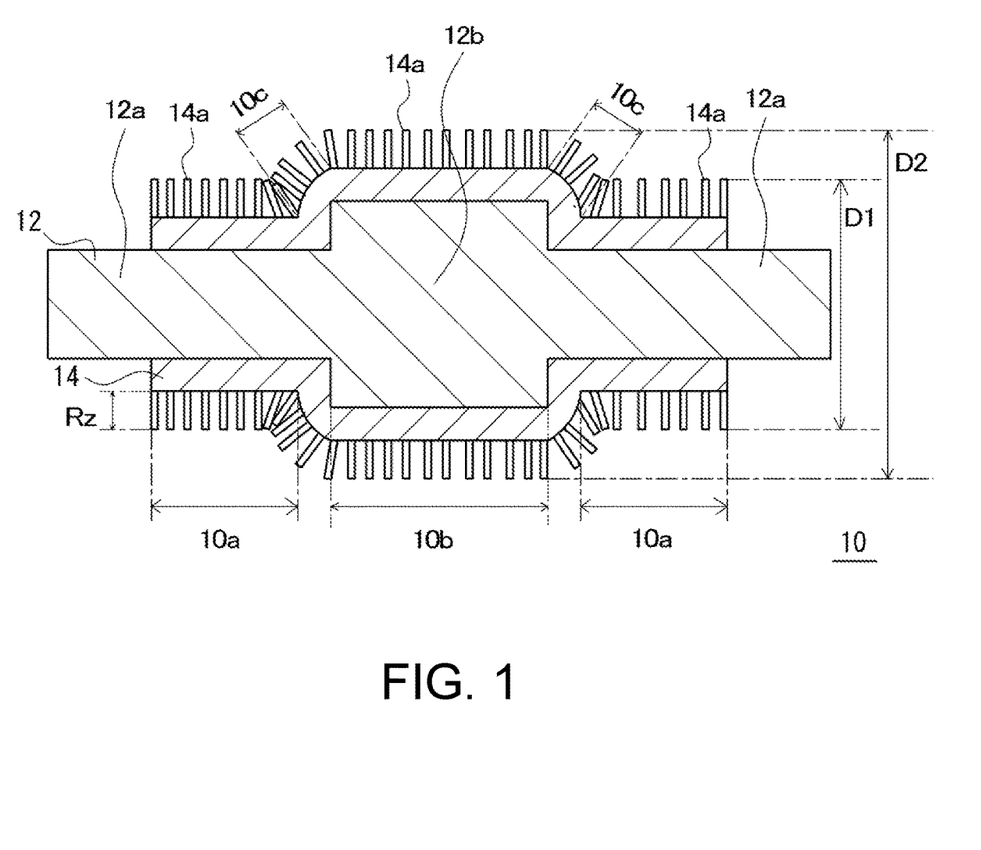
FIG. 1 is an axial cross-sectional view of a paper feeding roll according to one embodiment of the disclosure.

A paper feed roll according to the disclosure is described in detail. FIG. 1 is an axial cross-sectional view of a paper feeding roll according to one embodiment of the disclosure.

A paper feeding roll 10 according to one embodiment of the disclosure includes a shaft body 12 and an elastic material layer 14 formed on an outer peripheral surface of the shaft body 12.

The shaft body 12 is composed of a solid body made of metal or resin. The shaft body 12 has a stepped shape including portions of different outer diameters. Both ends in an axial direction of the shaft body 12 constitute a shaft small diameter portion 12a having a relatively small outer diameter, and a central portion in the axial direction of the shaft body 12 constitutes a shaft large diameter portion 12b having a relatively large outer diameter. The shaft small diameter portion 12a and the shaft large diameter portion 12b each have a uniform outer diameter and each are configured in a columnar shape. The shaft large diameter portion 12b is a portion including the central portion in the axial direction of the shaft body 12 and is of a continuous and single configuration. The shaft small diameter portion 12a is arranged at each of both ends of the shaft large diameter portion 12b and is configured as a pair. The shaft small diameter portion 12a and the shaft large diameter portion 12b are integrally configured around the same shaft center.

A difference in outer diameter between the shaft small diameter portion 12a and the shaft large diameter portion 12b may be 50 µm or more to 1,000 µm or less. Accordingly, a difference in outer diameter between a first outer diameter portion 10a and a second outer diameter portion 10b of the paper feeding roll 10, which will be described later, can be set in a desired range. The difference in outer diameter between the shaft small diameter portion 12a and the shaft large diameter portion 12b is more preferably 100 µm or more to 700 µm or less, even more preferably 100 µm or more to 500 µm or less.

From the viewpoint of achieving an excellent balance between proportions of the first outer diameter portion 10a and the second outer diameter portion 10b of the paper feeding roll 10 described later, or the like, a proportion of the length of the shaft large diameter portion 12b in the shaft body 12 is preferably 1.5% or more to 45% or less. The proportion of the length of the shaft large diameter portion 12b in the shaft body 12 is more preferably 5% or more to 40% or less, even more preferably 10% or more to 30% or less.

The elastic material layer 14 has a seamless structure having a cylindrical shape (tubular shape) and having no seams in a circumferential direction. The elastic material layer 14 is arranged to cover an outer periphery of the shaft body 12. The elastic material layer 14 before covering the outer periphery of the shaft body 12 has a cylindrical shape, an inner diameter and an outer diameter each being uniform along the entire axial direction, and an uniform thickness. A plurality of protrusions 14a that form surface unevenness (surface roughness) are formed on an outer peripheral surface of the elastic material layer 14. The plurality of protrusions 14a are uniformly distributed in each of the circumferential direction and the axial direction on the outer peripheral surface of the elastic material layer 14. The plurality of protrusions 14a are composed of columns extending in a direction orthogonal to the outer peripheral surface of the elastic material layer 14. The length in the axial direction of the elastic material layer 14 is shorter than the length in the axial direction of the shaft body 12.

The elastic material layer 14 covers the outer periphery of the shaft body 12 in a range in which a predetermined range of both ends of the shaft body 12 is exposed, so as to cover the outer periphery of the shaft body 12 of a stepped shape. The elastic material layer 14 that covers the outer periphery of the shaft body 12 has a relatively small outer diameter at both ends and a relatively large outer diameter at a central portion due to an outer shape of the shaft body 12 of a stepped shape.

The paper feeding roll 10 is configured by covering the outer periphery of the shaft body 12 of a stepped shape with the elastic material layer 14 of a cylindrical shape, and includes, in a portion where the elastic material layer 14 is provided, the first outer diameter portion 10a having a relatively small outer diameter and the second outer diameter portion 10b having a larger outer diameter than the first outer diameter portion 10a, due to the outer shape of the shaft body 12. Due to the outer shape of the shaft body 12, between the first outer diameter portion 10a and the second outer diameter portion 10b, a sloping portion 10c is provided connecting between the first outer diameter portion 10a and the second outer diameter portion 10b so that the outer diameter varies in a direction along the axial direction. The first outer diameter portion 10a is a portion located at both ends of the portion where the elastic material layer 14 is provided and having a relatively small outer diameter. The second outer diameter portion 10b is a portion located in a central portion (area including an axial center) of the portion where the elastic material layer 14 is provided and having a relatively large outer diameter. There is a step difference of a predetermined size between the first outer diameter portion 10a and the second outer diameter portion 10b. In FIG. 1, D1 indicates the outer diameter of the first outer diameter portion 10a, D2 indicates the outer diameter of the second outer diameter portion 10*b*, and the step difference between the first outer diameter portion 10*a* and the second outer diameter portion 10*b* is represented by half the size of the difference in outer diameter. As illustrated in FIG. 1, the outer diameter of the first outer diameter portion 10*a* and the second outer diameter portion 10*b* is of a size including surface unevenness.

Since the plurality of protrusions 14*a* that form surface unevenness (surface roughness) are formed on the outer peripheral surface of the elastic material layer 14, each of the first outer diameter portion 10*a*, the second outer diameter portion 10*b* and the sloping portion 10*c* includes surface unevenness (surface roughness). An extension direction of the protrusion 14*a* formed in the elastic material layer 14 in the first outer diameter portion 10*a* and an extension direction of the protrusion 14*a* formed in the elastic material layer 14 in the second outer diameter portion 10*b* are each radially outward. The protrusion 14*a* extends in a direction orthogonal to the outer peripheral surface of the elastic material layer 14 in the first outer diameter portion 10*a* and the second outer diameter portion 10*b*. On the other hand, since the protrusion 14*a* extends in the direction orthogonal to the outer peripheral surface of the elastic material layer 14 in the sloping portion 10*c*, an extension direction of the protrusion 14*a* formed in the elastic material layer 14 in the sloping portion 10*c* is different from the extension direction of the protrusion 14*a* formed in the elastic material layer 14 in the first outer diameter portion 10*a* and the extension direction of the protrusion 14*a* formed in the elastic material layer 14 in the second outer diameter portion 10*b*.

In the paper feeding roll 10 of such a configuration, when paper feeding is performed, the following occurs. FIG. 2A to FIG. 2D illustrate an endurance process of the paper feeding roll 10.

Figure 2A:
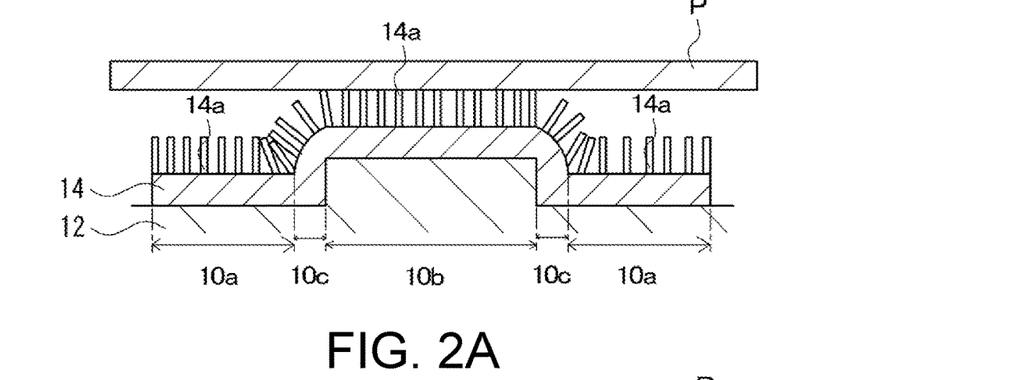
FIG. 2A to FIG. 2D illustrate an endurance process of the paper feeding roll.
Figure 2B:
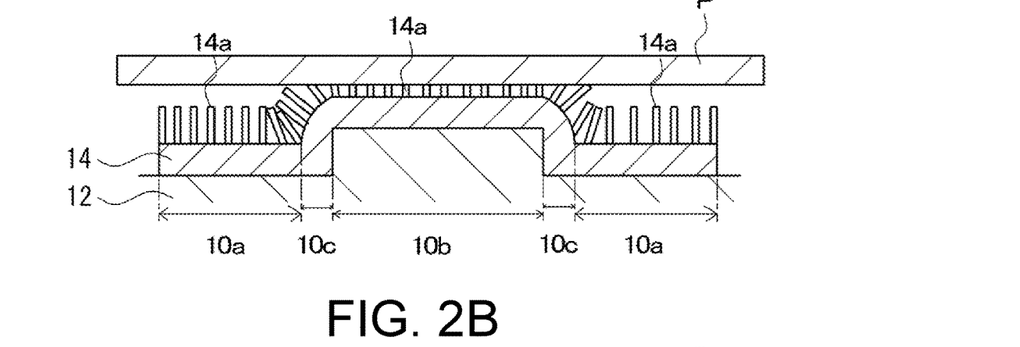
Figure 2C:
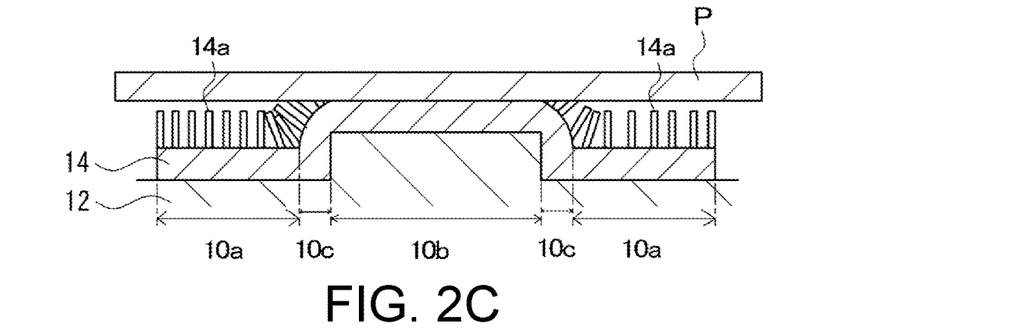

As illustrated in FIG. 2A, in an initial stage of paper feeding, the paper feeding roll 10 contacts sheet paper P at the elastic material layer 14 of the second outer diameter portion 10*b* having a large outer diameter. The sheet paper P does not contact the elastic material layer 14 of the first outer diameter portion 10*a* having a small outer diameter. Then, with an increase in the number of sheets fed, as illustrated in FIG. 2B and FIG. 2C, the surface unevenness of the elastic material layer 14 of the second outer diameter portion 10*b* wears away and disappears. When there becomes no surface unevenness in the second outer diameter portion 10*b*, paper dust becomes likely to adhere to the second outer diameter portion 10*b*, and the coefficient of friction decreases.

Figure 2D:
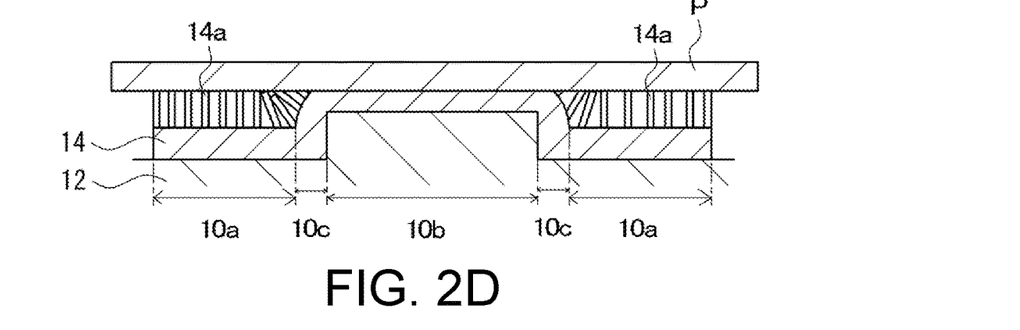

Here, since there is a step difference between the first outer diameter portion 10*a* and the second outer diameter portion 10*b*, when the second outer diameter portion 10*b* wears out, the paper feeding roll 10 may contact the sheet paper P at the elastic material layer 14 of the first outer diameter portion 10*a* having a relatively small outer diameter, as illustrated in FIG. 2D. In the paper feeding roll 10, even if the number of sheets fed increases and the surface unevenness of the second outer diameter portion 10*b* wears away, the coefficient of friction is maintained by the surface unevenness of the first outer diameter portion 10*a*.

At this time, a main part in contact with the sheet paper P switches from the second outer diameter portion 10*b* to the first outer diameter portion 10*a*. Since the paper feeding roll 10 includes the sloping portion 10*c* connecting between the first outer diameter portion 10*a* and the second outer diameter portion 10*b*, as illustrated in FIG. 2B and FIG. 2C, after the surface unevenness of the second outer diameter portion 10*b* has worn away, the paper feeding roll 10 may contact the sheet paper P at the elastic material layer 14 of the sloping portion 10*c*. Hence, during the switching from the second outer diameter portion 10*b* to the first outer diameter portion a decrease in the coefficient of friction can be suppressed, and the switching can be smoothly performed. If the step difference between the first outer diameter portion 10*a* and the second outer diameter portion 10*b* increases, the coefficient of friction is likely to decrease during the switching from the second outer diameter portion 10*b* to the first outer diameter portion 10*a*. In this case, the above effect is particularly pronounced.

A proportion of the sloping portion 10*c* in the portion where the elastic material layer 14 is provided may be 3% or more to 80% or less. The paper feeding roll 10 achieves the above effect by including the sloping portion 10*c*, and the proportion of the sloping portion 10*c* in the portion where the elastic material layer 14 is provided is 3% or more as a range in which the above effect becomes pronounced. From this viewpoint, the proportion of the sloping portion 10*c* in the portion where the elastic material layer 14 is provided is more preferably 5% or more, even more preferably 10% or more. On the other hand, if the proportion of the sloping portion 10*c* in the portion where the elastic material layer 14 is provided exceeds 80%, the proportion of the first outer diameter portion 10*a* and the second outer diameter portion 10*b* becomes relatively small, advantages of using a stepped structure for the paper feeding roll 10 are reduced, and a decrease in the coefficient of friction is unable to be suppressed. From this viewpoint, the proportion of the sloping portion 10*c* in the portion where the elastic material layer 14 is provided is more preferably 70% or less, even more preferably 50% or less. The proportion of the sloping portion 10*c* in the portion where the elastic material layer 14 is provided is represented by a length left by subtracting the lengths of the first outer diameter portion 10*a* and the second outer diameter portion 10*b* from the total length of the elastic material layer 14.

A difference in outer diameter between the first outer diameter portion 10*a* and the second outer diameter portion 10*b* may be 50 μm or more to 1,000 μm or less. If the difference in outer diameter is excessively small, advantages of using a stepped structure for the paper feeding roll 10 are reduced, and a decrease in the coefficient of friction is unable to be suppressed. From this viewpoint, the difference in outer diameter is more preferably 100 μm or more, even more preferably 150 μm or more. On the other hand, if the difference in outer diameter is excessively large, it is necessary to increase the surface roughness of the elastic material layer 14 accordingly. To increase the size of the protrusion 14*a* for forming the surface unevenness, it is also necessary to increase the width of the protrusion 14*a*. The effect of the surface unevenness is reduced, and a decrease in the coefficient of friction is unable to be suppressed. From this viewpoint, the difference in outer diameter is more preferably 700 μm or less, even more preferably 500 μm or less.

The surface roughness Rz of the first outer diameter portion 10*a* may be 50% or more to 200% or less of the step difference between the first outer diameter portion 10*a* and the second outer diameter portion 10*b*. If the surface roughness Rz is excessively small with respect to the step difference, after the surface unevenness of the second outer diameter portion 10*b* has worn away, contact with the sheet paper is unable to occur at the elastic material layer 14 of the first outer diameter portion 10*a*, and a decrease in the coefficient of friction during the switching from the second outer diameter portion 10*b* to the first outer diameter portion 10a is unable to be suppressed. From this viewpoint, the surface roughness Rz is more preferably 60% or more, even more preferably 80% or more of the step difference. On the other hand, if the surface roughness Rz is excessively large with respect to the step difference, since the switching from the second outer diameter portion 10b to the first outer diameter portion 10a is quickened, the coefficient of friction is quickly decreased, and reduction of sheet paper conveyance failure over a long period of time is not possible. From this viewpoint, the surface roughness Rz is more preferably 170% or less, even more preferably 150% or less of the step difference.

The surface roughness Rz of the first outer diameter portion 10a, the second outer diameter portion 10b and the sloping portion 10c may be 25 μm or more to 500 μm or less. When the surface roughness Rz is 25 μm or more, a sufficient coefficient of friction is maintained in each of the first outer diameter portion 10a, the second outer diameter portion 10b and the sloping portion 10c. From this viewpoint, the surface roughness Rz is more preferably 50 μm or more, even more preferably 100 μm or more. When the surface roughness Rz is 500 μm or less, surface roughness is provided in a proper amount, and the difference in outer diameter between the first outer diameter portion 10a and the second outer diameter portion 10b is easily kept in a proper range. From this viewpoint, the surface roughness Rz is more preferably 400 μm or less, even more preferably 300 μm or less. The surface roughness Rz is a ten-point average roughness, and is an average of values measured in arbitrary five places in accordance with JIS B0601 (1994). The ten-point average roughness Rz can be measured by observation using a laser microscope (such as "VK-9510" manufactured by Keyence).

Next, a material composition of the paper feeding roll according to the disclosure is described.

The shaft body 12 is composed of a solid body made of metal or resin. Examples of metal materials include stainless steel, aluminum, and plated iron. Examples of resin materials include a synthetic resin such as polyacetal (POM), acrylonitrile-butadiene-styrene copolymer (ABS), polycarbonate, and nylon. An adhesive, a primer or the like may be applied onto the shaft body 12 as necessary, and the adhesive, primer or the like may be made conductive as necessary.

The elastic material layer 14 is made of an elastic material such as rubber, elastomer, or resin. The elastic material is not particularly limited if it is a rubber-like elastic material. For example, a well-known material such as urethane rubber, hydrin rubber, silicone rubber, or EPDM may be used.

The elastic material layer 14 may be non-conductive, conductive, or semi-conductive. The elastic material layer 14 is particularly preferably non-conductive. The elastic material layer 14 that is non-conductive has volume resistivity in the range of $10^{12}$ Ω·cm to $10^{14}$ Ω·cm.

Various additives may be appropriately added to the elastic material layer 14 as necessary. Examples of the additives include a lubricant, a vulcanization accelerator, an antioxidant, a light stabilizer, a viscosity modifier, a processing aid, a flame retardant, a plasticizer, a filler, a dispersant, an antifoaming agent, a pigment, and a release agent.

The thickness of the elastic material layer 14 is not particularly limited, and may be appropriately set within the range of 0.1 mm to 10 mm. The thickness of the elastic material layer 14 is a thickness including the protrusion 14a that forms surface unevenness.

The elastic material layer 14 can be formed by molding with a molding die or the like. For example, a core material is coaxially installed in a hollow part of a roll molding die, an uncrosslinked rubber composition or the like is injected thereinto, heated, cured (crosslinked), and then removed from the die. Thereby, the elastic material layer 14 of a tubular shape can be formed. The molding die may be one in which a recess having a shape corresponding to the protrusion 14a is formed on an inner peripheral surface of the molding die. The protrusion 14a of the elastic material layer 14 can be formed, for example, by mold transfer using a molding die.

The recess on the inner peripheral surface of the molding die can be formed by various recess forming methods such as electric discharge machining, etching, shot blasting, polishing, eutectoid plating, and a combination thereof. In the eutectoid plating, uniform resin particles are contained in a plating solution, the resin particles are precipitated on the inner peripheral surface of the molding die together with plating metal, and the resin particles appearing on a plating surface are removed. Thereby, the recess can be formed on the inner peripheral surface of the molding die.

The paper feeding roll 10 can be formed by inserting the shaft body 12 into the elastic material layer 14 formed in a cylindrical shape.

According to the paper feeding roll 10 configured as above, since there is a step difference between the first outer diameter portion 10a and the second outer diameter portion 10b, even if the number of sheets fed increases and the surface unevenness of the second outer diameter portion 10b wears away, the coefficient of friction is maintained by the surface unevenness of the first outer diameter portion 10a. At this time, the main part in contact with the sheet paper switches from the second outer diameter portion 10b to the first outer diameter portion 10a. Even during the switching from the second outer diameter portion 10b to the first outer diameter portion 10a, a decrease in the coefficient of friction is suppressed by the sloping portion 10c connecting between the first outer diameter portion 10a and the second outer diameter portion 10b. According to the above, sheet paper conveyance failure can be reduced over a long period of time.

Although an embodiment of the disclosure has been described above, the disclosure is by no means limited to the above embodiment, and various modifications can be made without departing from the spirit of the disclosure.

For example, in the above embodiment, the shaft body 12 is illustrated as having a stepped shape including portions of different outer diameters. However, the shaft body may have a columnar shape (stepless shape) having a uniform outer diameter.

Figure 3:
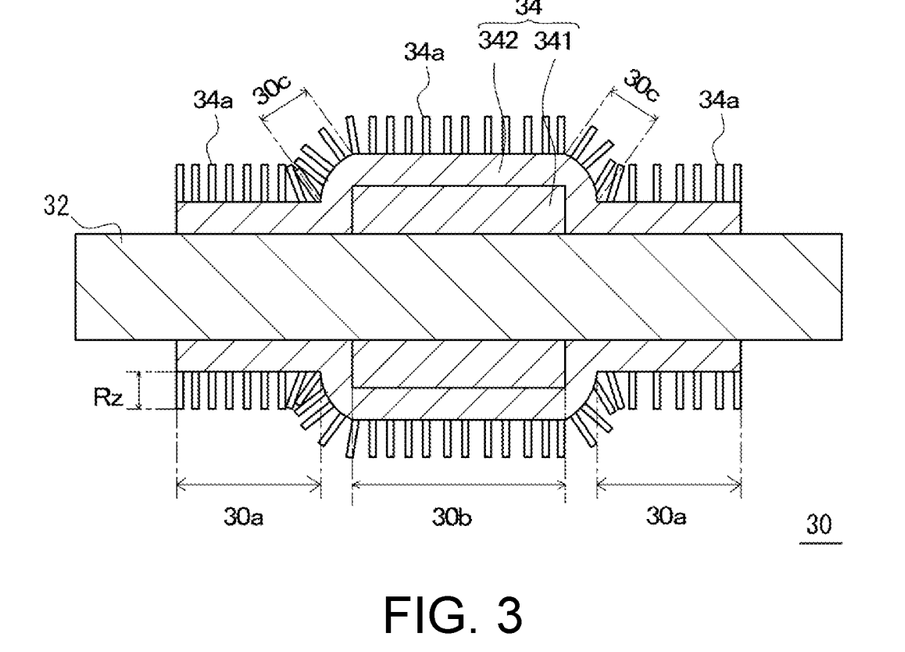
FIG. 3 is an axial cross-sectional view of a paper feeding roll according to another embodiment.

FIG. 3 illustrates a paper feeding roll according to another embodiment. A paper feeding roll 30 illustrated in FIG. 3 includes a shaft body 32 and an elastic material layer 34 formed on an outer peripheral surface of the shaft body 32. The shaft body 32 has a columnar shape (stepless shape) having a uniform outer diameter along the entire axial direction. The elastic material layer 34 has a two-layer structure including an inner elastic material layer 341 and an outer elastic material layer 342. The inner elastic material layer 341 has a relatively short length in the axial direction, and the outer elastic material layer 342 has a longer length in the axial direction than the inner elastic material layer 341.

The inner elastic material layer 341 and the outer elastic material layer 342 each have a seamless structure having a cylindrical shape (tubular shape) and having no seams in the circumferential direction. The inner elastic material layer 341 and the outer elastic material layer 342 are each made of an elastic material such as rubber, elastomer, or resin. The inner elastic material layer 341 is arranged in a central position in the axial direction of the shaft body 32 to cover an outer periphery of the shaft body 32. The outer elastic material layer 342 is arranged to cover the outer periphery of the shaft body 32 and the inner elastic material layer 341 so as to cover the inner elastic material layer 341. The inner elastic material layer 341 and the outer elastic material layer 342 before covering the outer periphery of the shaft body 32 each have a cylindrical shape, an inner diameter and an outer diameter each being uniform along the entire axial direction, and an uniform thickness. A plurality of protrusions that form surface unevenness (surface roughness) are not formed on an outer peripheral surface of the inner elastic material layer 341. A plurality of protrusions 34a that form surface unevenness (surface roughness) are formed on an outer peripheral surface of the outer elastic material layer 342. The plurality of protrusions 34a are uniformly distributed in each of the circumferential direction and the axial direction on the outer peripheral surface of the outer elastic material layer 342. The plurality of protrusions 34a are composed of columns extending in a direction orthogonal to an outer peripheral surface of the elastic material layer 34.

The outer elastic material layer 342 that covers the outer periphery of the shaft body 32 and the inner elastic material layer 341 has a relatively small outer diameter at both ends and a relatively large outer diameter at a central portion due to an outer shape in which the shaft body 32 is covered with the inner elastic material layer 341.

Since the paper feeding roll 30 is configured by covering the outer periphery of the shaft body 32 and the inner elastic material layer 341 with the outer elastic material layer 342 of a cylindrical shape, due to the outer shape of the above elements, in a portion where the outer elastic material layer 342 is provided, a first outer diameter portion 30a having a relatively small outer diameter and a second outer diameter portion 30b having a larger outer diameter than the first outer diameter portion 30a are provided. Due to the outer shape of the above elements, between the first outer diameter portion 30a and the second outer diameter portion 30b, a sloping portion 30c is provided connecting between the first outer diameter portion 30a and the second outer diameter portion 30b so that the outer diameter varies in a direction along the axial direction. The first outer diameter portion 30a is a portion located at both ends of the portion where the outer elastic material layer 342 is provided and having a relatively small outer diameter. The second outer diameter portion 30b is a portion located in a central portion of the portion where the outer elastic material layer 342 is provided and having a relatively large outer diameter.

Figure 4:
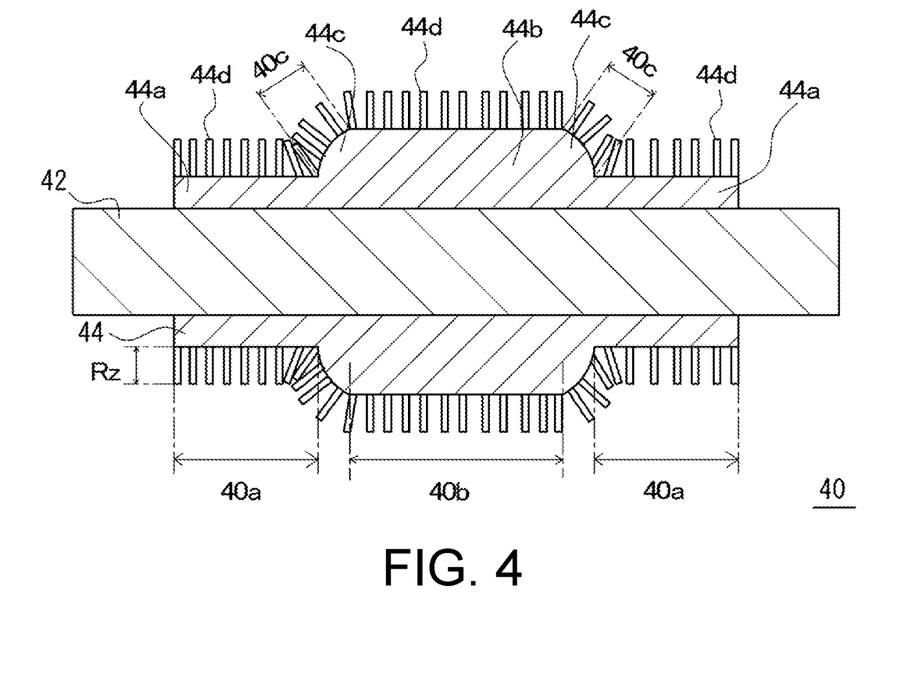
FIG. 4 is an axial cross-sectional view of a paper feeding roll according to another embodiment.

FIG. 4 illustrates a paper feeding roll according to another embodiment. A paper feeding roll 40 illustrated in FIG. 4 includes a shaft body 42 and an elastic material layer 44 formed on an outer peripheral surface of the shaft body 42. The shaft body 42 has a columnar shape (stepless shape) having a uniform outer diameter along the entire axial direction.

The elastic material layer 44 has a seamless structure having a cylindrical shape (tubular shape) and having no seams in the circumferential direction. The elastic material layer 44 is made of an elastic material such as rubber, elastomer, or resin. The elastic material layer 44 is arranged to cover an outer periphery of the shaft body 42. The elastic material layer 44 before covering the outer periphery of the shaft body 42 has a cylindrical shape, and has a stepped shape having a thick portion in a central portion in the axial direction. The elastic material layer 44 has a uniform inner diameter along the entire axial direction. The elastic material layer 44 has a relatively small outer diameter at both ends in the axial direction and a relatively large outer diameter in the central portion in the axial direction. Both ends in the axial direction of the elastic material layer 44 constitute a thin portion 44a having a relatively small thickness, and the central portion in the axial direction of the elastic material layer 44 constitutes a thick portion 44b having a relatively large thickness. Provided between the thin portion 44a and the thick portion 44b of the elastic material layer 44 is a thickness sloping portion 44c whose thickness varies in a direction along the axial direction. A plurality of protrusions 44d that form surface unevenness (surface roughness) are formed on an outer peripheral surface of the elastic material layer 44. The plurality of protrusions 44d are uniformly distributed in each of the circumferential direction and the axial direction on the outer peripheral surface of the elastic material layer 44. The plurality of protrusions 44d are composed of columns extending in a direction orthogonal to the outer peripheral surface of the elastic material layer 44.

Since the paper feeding roll 40 is configured by covering the outer periphery of the shaft body 42 with the elastic material layer 44, in a portion where the elastic material layer 44 is provided, a first outer diameter portion 40a having a relatively small outer diameter and a second outer diameter portion 40b having a larger outer diameter than the first outer diameter portion 40a are provided due to an outer shape of the elastic material layer 44. Between the first outer diameter portion 40a and the second outer diameter portion 40b, a sloping portion 40c is provided connecting between the first outer diameter portion 40a and the second outer diameter portion 40b so that the outer diameter varies in the direction along the axial direction. The first outer diameter portion 40a is a portion located at both ends of the portion where the elastic material layer 44 is provided and having a relatively small outer diameter. The second outer diameter portion 40b is a portion located in a central portion of the portion where the elastic material layer 44 is provided and having a relatively large outer diameter.

In the above embodiment, the second outer diameter portion 10b is located in the portion including the central portion of the portion where the elastic material layer 14 is provided. However, the second outer diameter portion may be located in a portion not including the central portion of the portion where the elastic material layer is provided. In the above embodiment, the second outer diameter portion 10b is of a continuous and single configuration (present in one place) in the central portion of the portion where the elastic material layer 14 is provided. However, the second outer diameter portion may be present in two or more places in the portion where the elastic material layer is provided. For example, the shaft body may include a plurality of shaft small diameter portions and a plurality of shaft large diameter portions alternately in the axial direction, such that the second outer diameter portion may be present in two or more places in the portion where the elastic material layer is provided. A plurality of inner elastic material layers illustrated in FIG. 3 may be present in the axial direction, such that the second outer diameter portion may be present in two or more places in the portion where the elastic material layer is provided. A plurality of thick portions illustrated in FIG. 4 may be present in the axial direction, such that the second outer diameter portion may be present in two or more places in the portion where the elastic material layer is provided.

In the above embodiment, the paper feeding roll 10 has a two-step configuration including the first outer diameter portion 10a and the second outer diameter portion 10b. However, a configuration may be employed that includes a third outer diameter portion having an outer diameter smaller than the first outer diameter portion and larger than the second outer diameter portion.

In the above embodiment, the first outer diameter portion 10a and the second outer diameter portion 10b are arranged to be axially symmetric. However, the first outer diameter portion and the second outer diameter portion may be arranged in positions so as to be axially asymmetric.

In the above embodiment, the plurality of protrusions 14a that form surface unevenness have a columnar shape. However, the plurality of protrusions may be of various shapes without being limited to the columnar shape. Examples of the shape of the protrusion include a hemispherical shape, an amorphous shape, a prism, a pyramid, a spherical segment, and a wedge shape. Examples of the prism include a cylinder, an elliptical cylinder, a prism (such as square prism and pentagonal prism), a fan-shaped cylinder, a D-shaped cylinder, and a gear-shaped cylinder. The prism may be a truncated prism (such as truncated cylinder and truncated prismatic body) having a shape defined by cutting off the head of the prism in a sloped shape or a curved shape. Examples of the pyramid include a cone, an elliptical cone, and a pyramid (such as square pyramid and pentagonal pyramid). The pyramid may be a truncated pyramid (such as truncated cone and truncated pyramid) having a shape defined by cutting off the head of the pyramid in a planar shape (frustum), a sloped shape or a curved shape. The spherical segment is a solid having a shape defined by cutting a sphere with two parallel planes. When a sphere intersects two parallel planes, a portion of a sphere surface sandwiched between these two planes is a spherical zone, and a solid surrounded by the spherical zone and these two planes is a spherical segment. One of the two planes of the spherical segment may be a surface that passes through the center of the sphere, or both of the two planes of the spherical segment may be surfaces that do not pass through the center of the sphere. The two planes of the spherical segment may be surfaces that approximate to planes, and may be, for example, curved surfaces having a greater radius of curvature than the spherical zone. Each upper base (upper plane) of the cylinder, the elliptical cylinder, the prism, the fan-shaped cylinder, the D-shaped cylinder, the gear-shaped cylinder, the frustum, and the spherical segment may be a polished surface. The polished surface can be formed by polishing each upper base.

In the above embodiment, the shaft body 12 is composed of a solid body made of metal or resin. However, the shaft body 12 may be composed of a hollow body (cylindrical body) made of metal or resin.

EXAMPLES

Hereinafter, the disclosure is described in detail by way of examples.

Example 1

A two-step, stepped shaft of a structure illustrated in FIG. 1 was prepared having outer diameters and lengths of each portion described in Table 1. By inserting the stepped shaft into a rubber tube (made of urethane) having a total length of 30 mm, a diameter of 10 mm, a thickness of 5 mm, and surface roughness Rz of 150 μm on an outer peripheral surface, a paper feeding roll as illustrated in FIG. 1 was produced. The rubber tube was produced by forming an elastic material layer of a urethane rubber composition on an outer periphery of a core material using a cylindrical molding die having a predetermined plurality of recesses on an inner peripheral surface. A plurality of protrusions that form surface unevenness (surface roughness) are formed on the outer peripheral surface of the rubber tube. The plurality of protrusions are uniformly distributed in each of a circumferential direction and an axial direction on the outer peripheral surface of the rubber tube. The plurality of protrusions are composed of columns extending in a direction orthogonal to the outer peripheral surface of the rubber tube.

Examples 2 to 9 and Comparative Examples 1 to 2

A paper feeding roll was produced in the same manner as in Example 1 except that the proportions of lengths of a shaft large diameter portion and a shaft small diameter portion of the stepped shaft were changed and the proportions of lengths of a first outer diameter portion, a second outer diameter portion and a sloping portion were changed.

Examples 10 to 13 and Comparative Examples 3 to 4

A paper feeding roll was produced in the same manner as in Example 3 except that the outer diameters of the shaft large diameter portion and the shaft small diameter portion of the stepped shaft were changed, a step difference between the first outer diameter portion and the second outer diameter portion was changed, and the surface roughness Rz of the outer peripheral surface of the rubber tube was changed.

Comparative Examples 5 to 6

A paper feeding roll was produced in the same manner as in Example 3 except that the surface roughness Rz of the outer peripheral surface of the rubber tube was changed.

Comparative Example 7

A paper feeding roll was produced in the same manner as in Example 1 except that the stepped shaft was changed to a stepless shaft.

Durability evaluation of the produced paper feeding roll was performed.

Durability Evaluation

The paper feeding roll was installed in a commercially available copier having a friction reverse roller (FRR) type paper feeding system, and paper feeding performance was evaluated. Commercially available sheet paper for a plain paper copier (PPC) was used as the sheet paper, 600,000 sheets (600 k sheets) were fed, and the number of occurrences of paper jams was measured. The paper feeding roll was evaluated as "A" if the number of occurrences of paper jams was 1 or less, as "B" if the number of occurrences of paper jams was 2 or more to 5 or less, and as "C" if the number of occurrences of paper jams was 6 or more to 10 or less. In the case where the number of occurrences of paper jams was 11 or more, the durability test was terminated. At that time, if the number of sheets fed was 400,000 (400 k sheets) or more to less than 600,000 (600 k sheets), the paper feeding roll was evaluated as "D"; if less than 400,000 (400 k sheets), the paper feeding roll was evaluated as "E".

TABLE 1

| | | | \multicolumn{13}{c}{Example} | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Length | First outer diameter portion | mm | 14.25 | 11.50 | 10.00 | 6.25 | 8.75 | 7.50 | 6.00 | 2.25 | 2.75 | 10.00 | 10.00 | 10.00 | 10.00 |
| | Second outer diameter portion | mm | 0.50 | 3.00 | 6.00 | 13.50 | 0.50 | 3.00 | 6.00 | 13.50 | 0.50 | 6.00 | 6.00 | 6.00 | 6.00 |
| | Sloping portion | mm | 0.50 | 2.00 | 2.00 | 2.00 | 6.00 | 6.00 | 6.00 | 6.00 | 12.00 | 2.00 | 2.00 | 2.00 | 2.00 |
| | Total length | mm | 30.00 | 30.00 | 30.00 | 30.00 | 30.00 | 30.00 | 30.00 | 30.00 | 30.00 | 30.00 | 30.00 | 30.00 | 30.00 |
| | Proportion of sloping portion | % | 3.3% | 13.3% | 13.3% | 13.3% | 40.0% | 40.0% | 40.0% | 40.0% | 80.0% | 13.3% | 13.3% | 13.3% | 13.3% |
| Outer diameter | First outer diameter portion | mm | 20.000 | 20.000 | 20.000 | 20.000 | 20.000 | 20.000 | 20.000 | 20.000 | 20.000 | 20.000 | 20.000 | 20.000 | 20.000 |
| | Second outer diameter portion | mm | 20.300 | 20.300 | 20.300 | 20.300 | 20.300 | 20.300 | 20.300 | 20.300 | 20.300 | 20.300 | 20.300 | 20.300 | 20.300 |
| | Difference in outer diameter | mm | 0.300 | 0.300 | 0.300 | 0.300 | 0.300 | 0.300 | 0.300 | 0.300 | 0.300 | 0.050 | 1.000 | 0.300 | 0.300 |
| Step difference | | μm | 150 | 150 | 150 | 150 | 150 | 150 | 150 | 150 | 150 | 25 | 500 | 150 | 150 |
| Surface roughness Rz | | μm | 150 | 150 | 150 | 150 | 150 | 150 | 150 | 150 | 150 | 25 | 500 | 75 | 300 |
| Rz/step difference | | % | 100% | 100% | 100% | 100% | 100% | 100% | 100% | 100% | 100% | 100% | 100% | 50% | 200% |
| Durability evaluation | | | B | A | A | A | A | A | A | A | B | B | A | C | B |

TABLE 2

| | | | \multicolumn{7}{c}{Comparative Example} | | | | | | |
|---|---|---|---|---|---|---|---|---|---|
| | | | 1 | 2 | 3 | 4 | 5 | 6 | 7 |
| Length | First outer diameter portion | mm | 13.20 | 1.75 | 10.00 | 10.00 | 10.00 | 10.00 | 30.00 |
| | Second outer diameter portion | mm | 3.00 | 0.50 | 6.00 | 6.00 | 6.00 | 6.00 | — |
| | Sloping portion | mm | 0.30 | 13.00 | 2.00 | 2.00 | 2.00 | 2.00 | — |
| | Total length | mm | 30.00 | 30.00 | 30.00 | 30.00 | 30.00 | 30.00 | 30.00 |
| | Proportion of sloping portion | % | 2.0% | 86.7% | 13.3% | 13.3% | 13.3% | 13.3% | — |
| Outer diameter | First outer diameter portion | mm | 20.000 | 20.000 | 20.000 | 20.000 | 20.000 | 20.000 | 20.000 |
| | Second outer diameter portion | mm | 20.300 | 20.300 | 20.040 | 21.100 | 20.300 | 20.300 | — |
| | Difference in outer diameter | mm | 0.300 | 0.300 | 0.040 | 1.100 | 0.300 | 0.300 | — |
| Step difference | | μm | 150 | 150 | 20 | 550 | 150 | 150 | — |
| Surface roughness Rz | | μm | 150 | 150 | 20 | 550 | 60 | 400 | 150 |
| Rz/step difference | | % | 100% | 100% | 100% | 100% | 40% | 267% | — |
| Durability evaluation | | | D | D | D | D | D | D | E |

In Comparative Example 7, the shaft as the shaft body was stepless. In the portion where the elastic material layer was provided, neither the first outer diameter portion having a relatively small outer diameter nor the second outer diameter portion having a larger outer diameter than the first outer diameter portion was provided, and there was no step difference. Hence, a decrease in the coefficient of friction was unable to be suppressed, and "E" was given in the durability evaluation. In contrast, in Examples 1 to 13, the shaft as the shaft body was stepped. In the portion where the elastic material layer was provided, the first outer diameter portion having a relatively small outer diameter and the second outer diameter portion having a larger outer diameter than the first outer diameter portion were provided in a predetermined size. Between the first outer diameter portion and the second outer diameter portion, the sloping portion was provided connecting between the first outer diameter portion and the second outer diameter portion so that the outer diameter varied in the direction along the axial direction. Hence, a decrease in the coefficient of friction was suppressed, and "C", "B", or "A" was given in the durability evaluation.

In Comparative Example 1, since the proportion of the sloping portion was small, a decrease in the coefficient of friction was unable to be suppressed during switching from the second outer diameter portion to the first outer diameter portion, and "D" was given in the durability evaluation. In Comparative Example 2, since the proportion of the sloping portion was large, the proportion of the first outer diameter portion and the second outer diameter portion was relatively small. Advantages of using a stepped structure for the paper feeding roll were reduced, a decrease in the coefficient of friction was unable to be suppressed, and "D" was given in the durability evaluation. In contrast, in Examples 1 to 9, since the proportion of the sloping portion was proper and a decrease in the coefficient of friction was suppressed, "B" or "A" was given in the durability evaluation.

In Comparative Example 3, since the difference in outer diameter between the second outer diameter portion and the first outer diameter portion was small and a small step difference was present, advantages of using a stepped structure for the paper feeding roll were reduced, a decrease in the coefficient of friction was unable to be suppressed, and "D" was given in the durability evaluation. In Comparative Example 3, since the surface roughness Rz was also small, a decrease in the coefficient of friction was unable to be suppressed in this respect, and "D" was given in the durability evaluation. In Comparative Example 4, since the difference in outer diameter between the second outer diameter portion and the first outer diameter portion was large and a large step difference was present, the surface roughness needed to be increased. The width of the protrusion was increased, the effect of surface unevenness was reduced, a decrease in the coefficient of friction was unable to be suppressed, and "D" was given in the durability evaluation. In contrast, in Examples 3 and 10 to 13, since a proper difference in outer diameter and a proper step difference were present between the second outer diameter portion and the first outer diameter portion, and the surface roughness was able to be properly set, a decrease in the coefficient of friction was suppressed, and "C", "B", or "A" was given in the durability evaluation.

In Comparative Example 5, since the surface roughness Rz of the elastic material layer was small, and the surface roughness Rz with respect to the step difference between the second outer diameter portion and the first outer diameter portion was small, a decrease in the coefficient of friction when the contact part with the sheet paper shifted from the second outer diameter portion to the first outer diameter portion was unable to be suppressed, advantages of using a stepped structure for the paper feeding roll were reduced, and "D" was given in the durability evaluation. In Comparative Example 6, the surface roughness Rz of the elastic material layer was large, the width of the protrusion was increased, the effect of surface unevenness was reduced, a decrease in the coefficient of friction was unable to be suppressed, advantages of using a stepped structure for the paper feeding roll were reduced, and "D" was given in the durability evaluation. In contrast, in Examples 3 and 10 to 13, since a proper difference in outer diameter and a proper step difference were present between the second outer diameter portion and the first outer diameter portion, and the surface roughness was able to be properly set, a decrease in the coefficient of friction was suppressed, and "C", "B", or "A" was given in the durability evaluation.

While embodiments and examples of the disclosure have been described above, the disclosure is not limited to the above embodiments and examples, and various modifications can be made without departing from the spirit of the disclosure.

What is claimed is:

1. A paper feeding roll comprising:
a shaft body; and
an elastic material layer formed on an outer peripheral surface of the shaft body, wherein
a first outer diameter portion and a second outer diameter portion having an outer diameter larger than an outer diameter of the first outer diameter portion are provided in a portion where the elastic material layer is provided;
between the first outer diameter portion and the second outer diameter portion, a sloping portion is provided connecting between the first outer diameter portion and the second outer diameter portion so that the outer diameter varies in a direction along an axial direction;
a proportion of the sloping portion in the portion where the elastic material layer is provided is 3% or more to 80% or less;
a difference in outer diameter between the first outer diameter portion and the second outer diameter portion is 50 μm or more to 1,000 μm or less;
a plurality of protrusions that form surface unevenness are formed on an outer peripheral surface of the elastic material layer; and
surface roughness (Rz) of the first outer diameter portion is 50% or more to 200% or less of a step difference between the first outer diameter portion and the second outer diameter portion.

2. The paper feeding roll according to claim 1, wherein an extension direction of the protrusion formed in the elastic material layer in the sloping portion is different from the extension direction of the protrusion formed in the elastic material layer in the first outer diameter portion and the extension direction of the protrusion formed in the elastic material layer in the second outer diameter portion.

3. The paper feeding roll according to claim 1, wherein the proportion of the sloping portion in the portion where the elastic material layer is provided is 10% or more to 50% or less.

4. The paper feeding roll according to claim 1, wherein the second outer diameter portion is located in an area comprising an axial center.

5. The paper feeding roll according to claim 1, wherein the surface roughness (Rz) of the first outer diameter portion, the second outer diameter portion and the sloping portion is 25 μm or more to 500 μm or less.

6. The paper feeding roll according to claim 1, wherein the shaft body comprises a portion having a relatively largest outer diameter in the second outer diameter portion, and the first outer diameter portion, the second outer diameter portion and the sloping portion are formed due to an outer shape of the shaft body.

7. A method for manufacturing the paper feeding roll according to claim 6, comprising:
   inserting the shaft body into the elastic material layer formed in a cylindrical shape, and forming the paper feeding roll.

* * * * *